United States Patent [19]

Taylor et al.

[11] Patent Number: 4,467,373
[45] Date of Patent: Aug. 21, 1984

[54] STORAGE AND RETRIEVAL OF DIGITAL DATA ON VIDEO TAPE RECORDERS

[75] Inventors: Richard J. Taylor, London; Paul R. N. Kellar, Newbury, both of England

[73] Assignee: Micro Consultants Limited, Berkshire, England

[21] Appl. No.: 309,304

[22] Filed: Oct. 7, 1981

[30] Foreign Application Priority Data

Oct. 9, 1980 [GB] United Kingdom ................ 8032631

[51] Int. Cl.³ ........................ H04N 5/782; H04N 5/94
[52] U.S. Cl. .................................... 360/38.1; 360/32; 371/38; 371/40
[58] Field of Search ................... 360/38.1, 22, 32, 40; 358/336, 314; 371/38, 53, 40

[56] References Cited

U.S. PATENT DOCUMENTS

| | | | |
|---|---|---|---|
| 4,142,243 | 2/1979 | Bishop et al. | 371/53 |
| 4,206,440 | 6/1980 | Doi et al. | 360/38.1 |
| 4,211,997 | 7/1980 | Rudnick et al. | 360/38.1 |
| 4,224,642 | 9/1980 | Mawatari et al. | 360/38.1 |
| 4,277,807 | 7/1981 | Baldwin | 360/32 |
| 4,352,129 | 9/1982 | Baldwin | 360/32 |
| 4,355,324 | 10/1982 | Reitmeier | 360/22 |
| 4,376,955 | 3/1983 | Reitmeier | 360/38.1 |
| 4,393,502 | 7/1983 | Tanaka et al. | 371/40 |
| 4,400,810 | 8/1983 | Ive | 371/40 |

*Primary Examiner*—Donald E. McElheny, Jr.
*Attorney, Agent, or Firm*—Dowell & Dowell

[57] ABSTRACT

A digital data manipulation system for compensating for drop outs on a video recording medium. Data received by an assembler is assigned to a predetermined non-standard format prior to recording. Addition of synchronizing information via process amplifier allows the digital data to be recorded on an analog video tape recorder as lines of video information. A checksum generator and parity bit generator are provided to effect two dimensional coding indicative of assigned data content both prior to recording and following playback. By detecting any differences between the coding information this identifies drop out errors to allow compensation therefor.

9 Claims, 18 Drawing Figures

| CHECK SUM REGISTER LOCATION | CASE SITUATION | | | | | | |
|---|---|---|---|---|---|---|---|
| | 1 | 1 | 2 | 3 | 3 | 3 | 3 |
| 1 | X | 0 | 0 | X | 0 | 0 | 0 |
| 2 | 0 | 0 | 0 | X | X | 0 | 0 |
| 3 | 0 | X | 0 | 0 | 0 | X | 0 |
| 4 | 0 | 0 | 0 | 0 | 0 | X | 0 |
| 5 | 0 | 0 | 0 | 0 | X | X | 0 |
| 6 | 0 | 0 | 0 | 0 | 0 | 0 | X |
| 7 | 0 | 0 | 0 | 0 | 0 | 0 | X |
| 8 | 0 | 0 | 0 | 0 | 0 | 0 | X |
| 9 | 0 | 0 | X | 0 | 0 | 0 | 0 |

X = Error
O = No error

STORAGE AND RETRIEVAL OF DIGITAL DATA ON VIDEO TAPE RECORDERS

BACKGROUND TO THE INVENTION

The invention relates to the storage and retrieval of digital video data on a video tape recorder (VTR).

A system disclosed in British Patent application 7,930,222 (Publication 2,059,713) and U.S. patent application Ser. No. 172,721 relates to a video information system which allows video digital data to be recorded onto a standard analogue video tape recorder.

With modern types of VTR, there is a tendency for degradation due to signal drop out (resulting from imperfections on the tape for example). When such tapes are used for duplication purposes, any errors are compounded.

FIG. 1 shows a typical defect on the video tape 10. The scratch 11 extends across the path of several recorded fields and the analogue information from the tape on playback is visibly degraded as a result of the drop outs 12 due to this scratch. Several drop outs on a line will give the result of a horizontal stripe on the picture. Thus because such a drop out has no vertical structure, using the basic recording technique described in the aforementioned patent application will mean that the serially recorded data will result in errors occuring whenever a drop out occurs. It is known to compensate for drop outs on normal video information by using data from an adjacent line above or below the drop out to replace any data lost (see U.K. Pat. No. 1,436,757 and U.S. Pat. No. 3,949,416 for example). Whilst this works well for normal analogue picture information, in the above information system using digital data its configuration is such that adjacent data will not correspond to the data missing in the drop out so this type of error correction is ineffective.

OBJECT OF THE INVENTION

The present invention is concerned with providing an arrangement which may be used for the above purpose for example but having greater immunity to signal drop outs.

SUMMARY OF THE INVENTION

According to the invention there is provided a digital data manipulation system for compensating for drop outs on a video recording medium comprising data receiving means for assigning data to a predetermined format prior to recording, coding means for providing two-dimensional coding indicative of assigned data content both prior to recording and following playback, and detector means for identifying any differences between the coding information indicative of drop out errors to allow compensation therefor.

BRIEF DESCRIPTION OF THE DRAWINGS

The invention will now be described with reference to the accompanying drawings, in which.

DESCRIPTION OF PREFERRED EMBODIMENT

Figure 1:
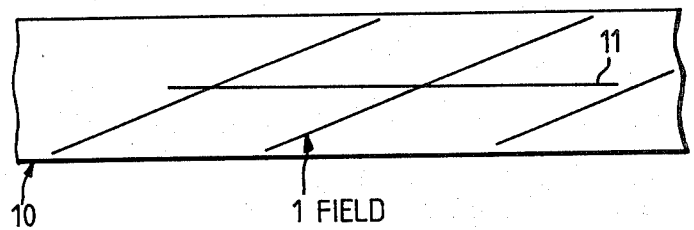
FIG. 1 shows a typical recorded video tape with imperfections thereon.
Figure 2:
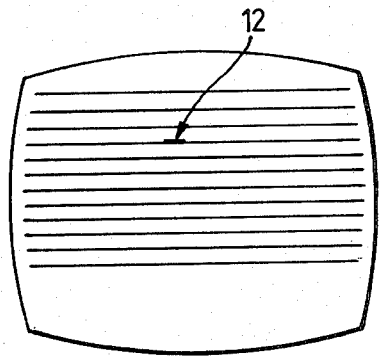
FIG. 2 shows a drop out reproduced on playback.
Figure 3:
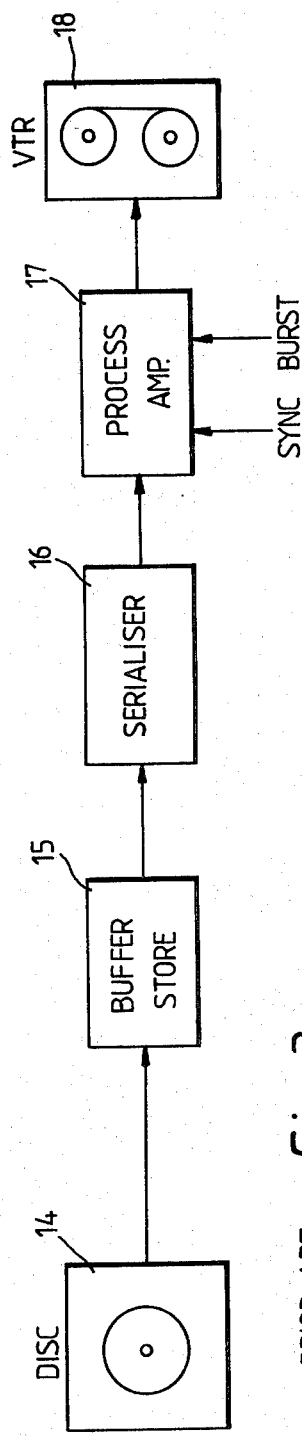
FIG. 3 shows the known recording system.

FIG. 3 shows part of the information transfer system of patent application Ser. No. 7,930,222 associated with recording. Video data in digital form is already present on disc 14 and typically during read out, the output data rate from such a disc (e.g. a Winchester disc) will be 1 Megawords/second, each word being in 8 bit parallel form. This data is received by buffer store 15 which holds this data which will typically appear as interrupted blocks with data gaps according to the normal read out pattern of such a standard disc. The buffer store outputs the data as a continuous stream at a somewhat slower rate typically ½ Megaword/sec again in 8 bit parallel form. This data is received by serialiser 16 which converts the parallel data into serial form, thus providing a data output rate typically 4M bit/sec. This data stream (shown in FIG. 4) is received by a process amplifier 17 in which syncs and colour burst are added so as to produce a digital data stream with analog sync and burst information. This allows the data to be recorded on a standard analogue VTR 18. The syncs and colour burst may be provided from a local generator in well known manner. On replay the serial data stream will be separated from the synchronising information and typically this digital data will be converted into parallel form and buffered into data blocks compatible with a receiving disc.

Figure 4:
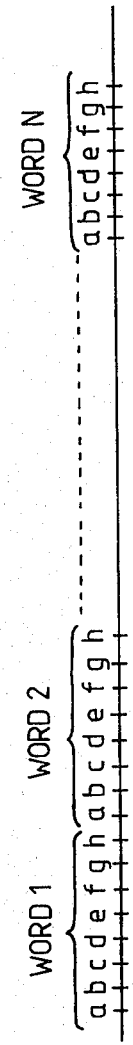
FIG. 4 shows the data format of this system prior to recording.

As shown in FIG. 4, the serial 8bit word format is recorded onto the tape as a single video line of data (words 1 to N) and such a system works well except when a drop out occurs as the data lost cannot be retrieved.

Figure 5:
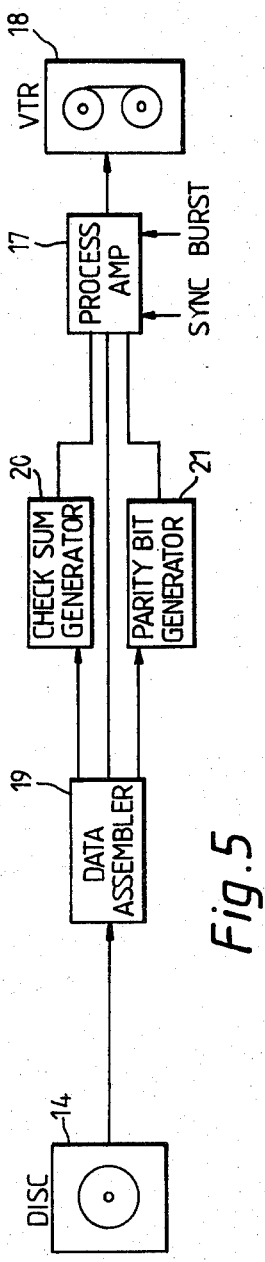
FIG. 5 shows the system of the present invention associated with recording.

The present arrangement now shown in FIG. 5 provides the ability of detecting and compensating for drop outs on the replayed data by rearranging the data format and by including coding information to accompany the digital data when recorded on an analogue tape recorder or other recording medium.

Incoming information is received by data assembler 19 which data is shown in this example as being received from disc 14 though other data sources could be used. The assembler 19 formats the data into a predetermined configuration described in more detail below and coded information indicative of data contact is provided by the check sum and parity bit generators 20 and 21 respectively and in this example the composite data passes to process amplifier 17 where syncs and colour burst are added to the digital data to provide the analogue tape recorder 18 with the capability of handling the incoming information. The data assembler 19 is designed to rearrange the data into a non-standard format which lends itself to aiding recovery or compensation for any lost data rather than the sequential word format of FIG. 4. The generators 20 and 21 provide content information for this data such that a "two-dimensional" code is provided to accompany the rearranged data when received by the process amplifier for example.

Figure 6:
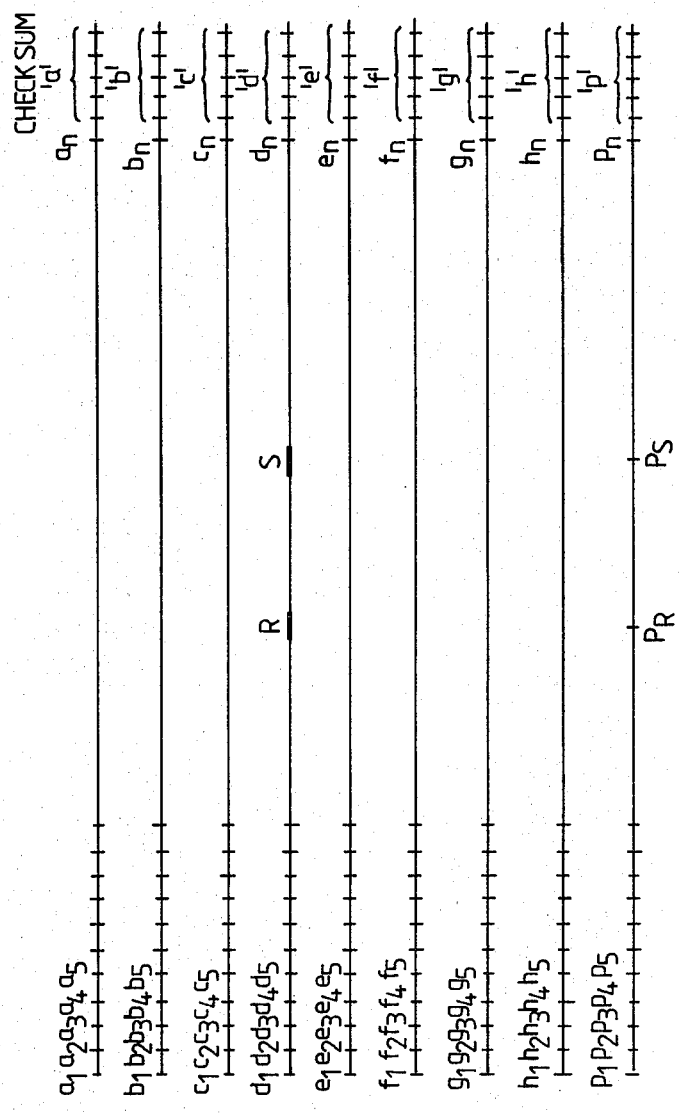
FIG. 6 shows one embodiment of the data format of the present invention.

One way of rearranging the video data together with the coding data is shown in FIG. 6 which will be received by the process amplifier 17 for recording as if it were 9 successive lines of normal video information.

Figure 7:
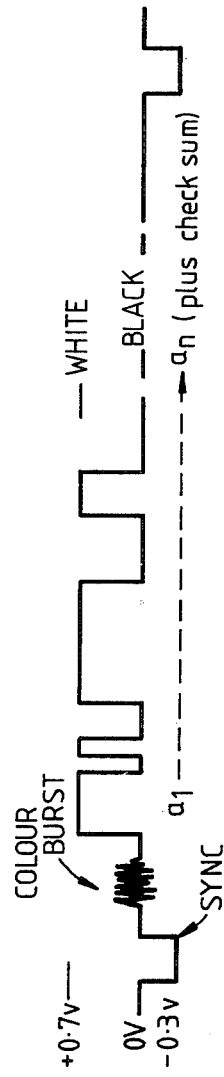
FIG. 7 shows the format of data along one T.V. line.

The amount of data, say bits $a_1-a_n$, with its check sum is chosen to correspond to a 'length' equivalent to the active T.V. line length. If such digital data as recorded were to be displayed on the T.V. screen it would be somewhat similar to a random chessboard effect with white peak level defining the logically high levels and black level defining the logically low levels, the colour burst and syncs providing the necessary timing information as shown by the T.V. line in FIG. 7.

Figure 8:
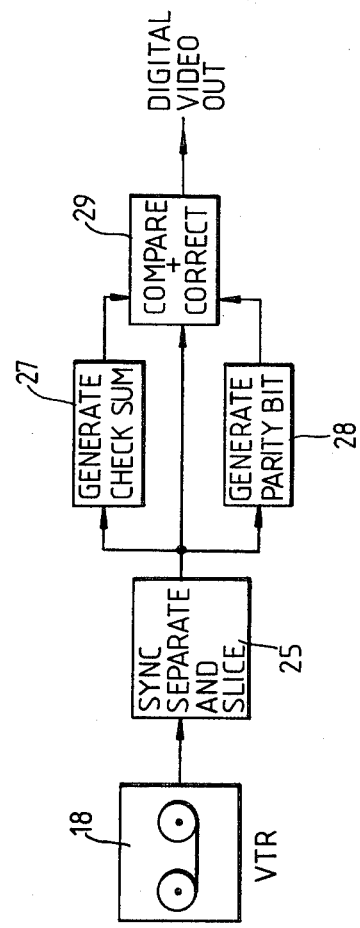
FIG. 8 shows the system of the present invention associated with playback.

Drop outs R and S in FIG. 6 are included on one line for explanation of the system operation. The 9 lines of data include 8 lines carrying video information and the last line carrying parity information. Rather than in the FIG. 4 arrangement, due to the presence of assembler 19 the lines each carry one bit of each word, so that the most significant bit (MSB) a for the words 1 to N are all on one line and so on, rather than the normal serial data format of $a_1$ to $h_1$, $a_2$ to $h_2$, $a_3$ to $h_3$ etc. At the end of the line, a check sum word is included which gives a count of the number of times a 'high' has occurred in the N bits on that line. The check sum word is of sufficient length to define the maximum value of N. For example, if N=128 bits (which is also the number of words handled) then the check sum will need to be a 7 bit serial word. A check sum is provided for each line representing the data bits 'a' and so on. In addition a check sum is provided for the parity bits, each parity bit $P_1$ to $P_n$ being generated in dependence on whether there are an odd or even number of 'highs' in the word associated with it. By providing both the check sum and the parity bit for the data format provided, it is possible to produce a two dimensional check so as to be able to identify and also to correct any subsequent errors on playback as now explained in relation to FIG. 8.

On playback the digital data from VTR 18 is provided via the output of sync separator and slicer block 25, which data includes the previously recorded check sum and parity bits. On playback however the check sum and parity bits are again computed this time on the outgoing data by means of generators 27 and 28 respectively. The recorded check sum made available on playback is compared in comparator and corrector block 29 with the generated check sum calculated from the played back data and the parity bit is similarly checked and if no error between these calculations is detected then the outgoing data is passed without modification to the output, since a lack of error indicates identity between input and output of the data (i.e. no drop outs). If comparison of a parity bit for a particular word indicates a difference (i.e. an error) then the location of the error can be detected by the comparison of the check sum. By inverting the status of the offending bit in corrector 29 the correct information previously lost has been reconstituted. Thus looking at the example of the drop outs R and S of FIG. 6, during the recording phase the correctly calculated check sum and parity bits will accompany the data onto the tape. Due to drop outs, on playback the calculated check sum 'd' will be different as will parity bits $P_R$ and $P_S$. This effectively defines the X and Y coordinates of the drop outs and by inverting the output at these points the correct data is provided.

Thus by recording the check sum for each line at the end of each line and the parity bits for each word on the 9th line and repeating the calculation process on playback and comparing results, the corruption of data can be detected and corrected. This corrected data is thus available for further use, for example it can be passed to the disc 14.

Subsequent data for recording is handled in the next and subsequent blocks of 9 video lines.

One arrangement for providing the coding of the data prior to recording on the tape is now described in more detail with reference to FIG. 9.

The incoming digital video information shown arriving in typical known format of 8 bit parallel word form is passed via switch 30 to one or other storage RAM 32 or 33 (in the illustration the switch is connected to RAM 32). The write cycle for a RAM is completed when the predetermined number of words (e.g. 128) has been written into its internal locations designated by the counter configuration within address block 44 in known manner. As shown, during write in of RAM 32, read out from RAM 33 can be effected as selected by switch 35. Thus write in to a RAM is a word rate (say 1 μs) and the RAM would be filled in 128 μs if the data is received as a continuous stream. Other rates would be possible by varying the word rate and RAM capacity. In practice when data is being received from disc 14 it is typically received as non-continuous bursts of data so the RAM will take longer to fill in this case. Clocks from the disc 14 received by the input clock generator 42 ensure that the RAMs correctly receive the incoming data. The normal sequencing capability of the clock generator 42 is conveniently used to increment the address block 44. Such generators have knowledge of start of field or line and with internal counters can count the picture point clocks to provide the necessary sequencing when handling disc (or VTR) information. A control input to the disc 14 from generator 42 determines when the disc is allowed to produce the video data (and clocks). As shown, the intermittent operation of the disc is effectively under the control of the VTR 18 via output clock generator 43, and this is necessary because the VTR will run continuously and thus require priority. After loading RAM 32, switches 30 and 31 are changed to connect the other RAM and the write process continued. Whilst RAM 32 is receiving data, data from RAM 33 is read out (non-destructively) from its locations in the sequence dependent on the counter configuration within read address block 45. Thus words 1 through 128 are passed via switch 35 to switch 37. Switch 37 is only concerned with passing one of the 8 bits from each word and as shown bit 'a' from word 1 through 128 is passed as a single bit stream to switch 40 to provide the data in the format shown in line 1 of FIG. 6. The check sum is calculated for this bit stream by counter 38, the output thereof being in 7 bit (or 8 bit may be more convenient as being a standard item) parallel form. This parallel bit word is converted into serial form by converter 39, switch 40 being arranged to switch after the passage of the 'a' bits to allow the check sum to accompany the data as shown in FIG. 6.

The binary levels are converted into suitable black or white levels as necessary in generator 41 (which is typically part of the process amplifier 17) before the sync and colour burst information is added as described above prior to recording on the VTR 18. The check sum counter 38 starts at zero at the start of the line and is incremented each time a 1 (high) is detected and the final count for the line (after word 128) is then made available via converter 39 and switch 40.

Thus $a_1$; $a_2$ . . . to $a_{128}$ are sent serially to the tape rather than the normal serial format of $a_1$ to $h_1$; $a_2$ to $h_2$ etc shown in FIG. 4.

The read out process is then repeated with switch 35 in the same position but with switch 37 moved to receive the 'b' bit of words 1 to 128. Although only one bit of each word is passed on, it is convenient to read out the entire 8 bits of each word throughout the RAM. Sequentially switch 37 is moved after each read cycle to provide a total of 9 identical read operations. The RAM read operations for a cycle will be substantially faster than the write operations as the synchronising information from the VTR will typically result in a clock rate from generator 43 of several MHz and the data can be received continuously rather than in bursts as in the disc so that the 9 operations may be accommodated within the period taken to effect a single write operation in the other RAM. During the 9th read operation, the parity bit is generated for each data word by generator 36. The 8 bit data (a to h) for word 1 is received by the known generator which if a high is detected an even number of times (i.e. twice, four or eight times) then a logically high output is provided for that word (see $P_1$ of FIG. 6). If an odd number of highs occur for that word then a logically low level is provided.

The parity is repeated on each word as it is read out and with switch 37 connected to receive these parity bits, $P_1$ through $P_{128}$, the check sum counter 38 operates to provide a count of the highs detected thereon to provide a check sum output via converter 39 to accompany the parity bits as shown in FIG. 6 as line 9.

After completion of the read out cycles from RAM 33, the switches 34 and 35 respectively change position so that write in to RAM 33 and read out of the accumulated data from RAM 32 can be effected. This data will constitute the next 9 video lines of data recorded, and so on until all the available incoming data is recorded as a number of fields.

The sequencing capabilities of output clock generator 43 can conveniently be used as shown to control switches 30-35, input generator 42 and provide clocks for read address block 45. Generator 43 can also be used to operate switch 37 at line rate and blocks 38 and 39 at bit rate. Switch 40 is actuated for a given number of bits at the end of each line to allow passage of the check sum before returning to the position shown.

Figure 10:
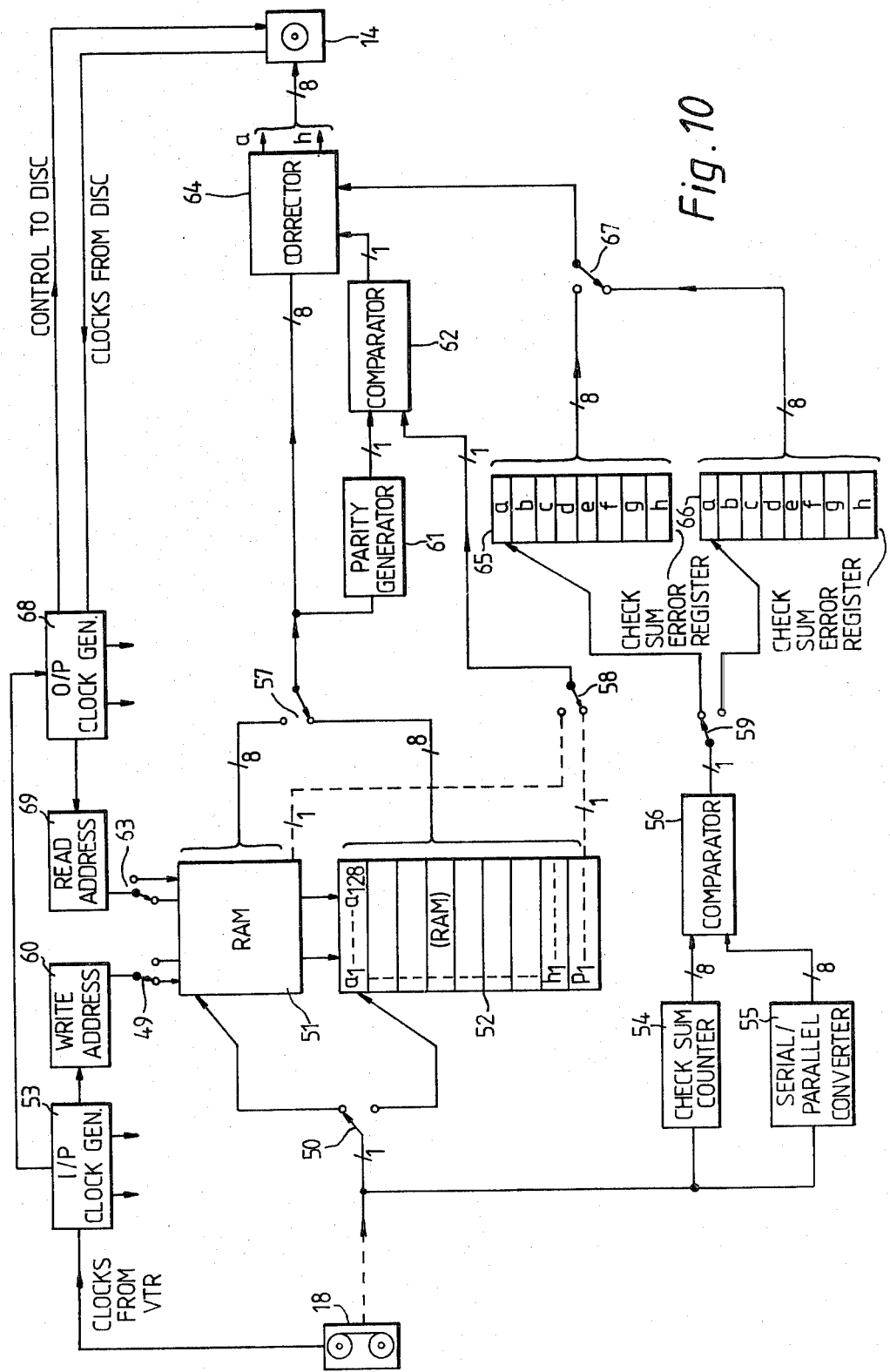
FIG. 10 shows one arrangement concerned with realising the playback side of the system.

The processing of the replayed data will now be described in more detail with reference to FIG. 10. The digital data from the VTR (having been stripped of syncs and shaped by slicing as described above) is passed via switch 50 to either RAM 51 or 52. Whilst RAM 51 is being written into in locations defined by address block 60 via switch 49, RAM 52 is available for read out via switch 57 from locations governed by address block 69 via switch 63. As shown schematically, the data has been written into RAM 52 such that bit 'a' of words 1 to 128 are in sequence followed by bits 'b' to 'h' and the parity bits $P_1$ to $P_{128}$. Thus the data can be considered as effectively being stored in rows, switching at line rate, and it is arranged via the counters within write address block 60 that the addressing is always such that the first bit 'a' of the first word goes into the first line at the start of each field, so that correlation between record and playback is maintained. During playback the system switches will this time be under the control of input generator 53, as again the VTR will run continuously whilst the disc is capable of handling data in bursts when permitted by the system control. The blocks associated with write sequencing will also receive clocks from generator 53.

It is to be noted that the check sum for a particular line is not stored in the RAM but is received by converter 55 which provides the check sum as an 8 bit parallel word for receipt by comparator 56. Prior to the receipt of the previously recorded check sum, the check sum counter 54 is calculating the check sum for that line so that the presently calculated and previously calculated check sums are available to comparator 56 which produces a binary 'low' output if no difference is detected, and a high if an error is detected. The comparator result is passed via switch 59 to one or other check sum registers 65 or 66, such that the result of the 'a' bits from the first video line is stored in one location followed by the 'b' bit etc as shown in FIG. 10. Output clock generator 68 in practice controls the sequencing of the disc and the blocks associated with the read side of the system. Whilst one RAM and register is busy with a write in sequence, the others are available for read out. Thus as shown bits 'a' to 'h' on words 1 through 128 pass from RAM 52 via switch 57 to the corrector 64. At the same time, the parity generator 61 is calculating the parity status of each outgoing word in sequence. The parity bit for each word is compared with the equivalent parity bit received from RAM 52 via switch 58. If a difference is detected then a 'high' is produced by the comparator, if low then no error has been detected. The corrector 64 receives the single bit comparator output from the parity check together with the 8 bit check sum register output via switch 67. The corrector allows all 8 bits 'a' to 'h' for a word to pass unchanged if no parity error indication is received from comparator 62. When an error is received, then only the particular bit of the word identified by an error indication from the check sum register will be corrected (i.e. inverted), all other bits will pass through unchanged. Thus from FIG. 6, a parity error will be detected for R and S ($P_R$ and $P_S$) as will a check sum error for bit 'd' for that line. Because of the coding arrangement, both drop out errors R and S will be corrected, since the system is capable of effectively defining the location of a number of errors.

Figure 11:
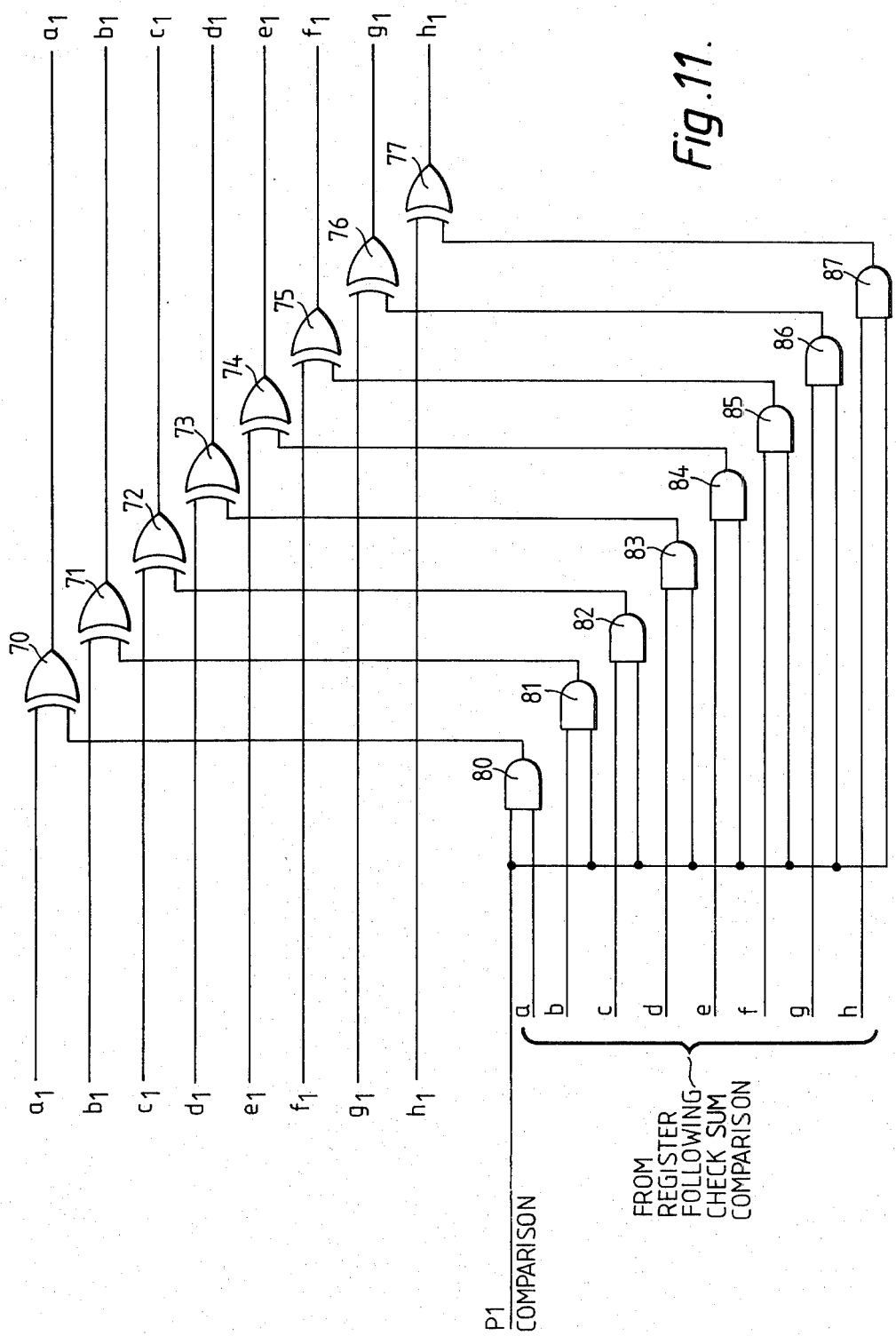
FIG. 11 shows one embodiment of the data corrector of FIG. 10.

The corrector 64 can be constructed from standard logic elements as shown in the embodiment of FIG. 11. Bits 'a' to 'h' are received by one input of Exclusive OR gates 70 to 77 respectively. The other input to these gates is connected to the output of AND gates 80 through 87 respectively. The output of comparator 62 (of FIG. 10) is common to one input of gates 80 to 87 whilst the other input of the gates receives the check sum error status from register 66 (or 65) of FIG. 10. As shown the eight bits from word 1 are present at the input to gates 70 to 77. An error previously detected on the parity check for word P₁ will be identified as a high by gates 80 through 87. If an error for any bit is received from register 66 as a result of the earlier check sum comparison this will be identified as a high by the particular AND gate. This will cause that gate output to go high and result in inverting the output from the associated Ex.OR gate. Bits without any error will pass through unaltered. Thus the inputs 'a' to 'h' for Ex.OR gates will be changing at word rate as will the parity bit to gates 80 to 87. However, the input from the register will be changing at line rate.

Although the record and playback arrangements have generally been described as comprising separate items, it is clear that with suitable switching some of the system elements can be shared to provide use during both record and playback.

Figure 12:
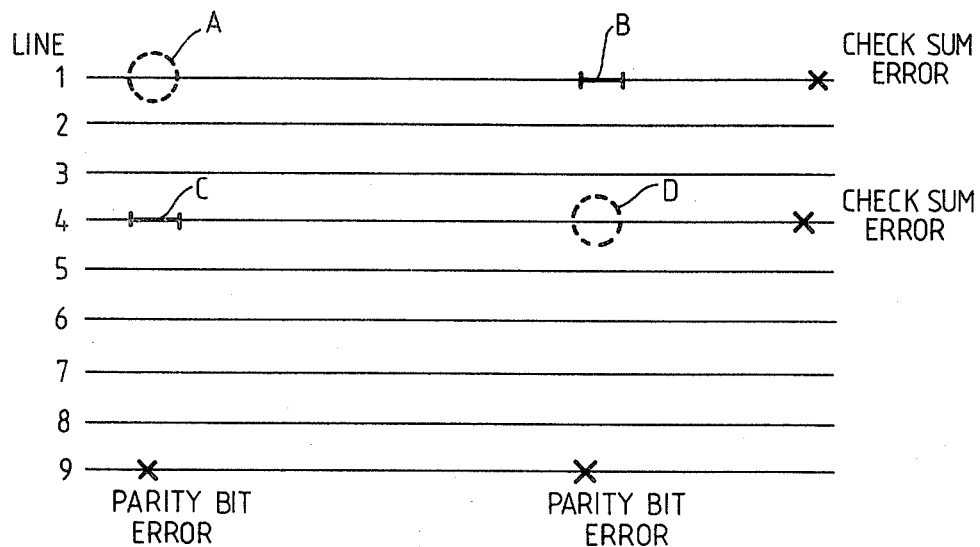
FIG. 12 shows drop outs occurring on more than one line.

With the system described above using the format of FIG. 6, this works well with normal drop out occurances. Thus it will cope with more than one drop out on any particular line provided that no more than one line in any particular block has drop outs. (In this case 8 lines constitutes the block). Should however there be more than one line in the block which has drop outs, say lines 1 and 4, then the desired correction cannot be maintained and the corrector has to be overridden in this extreme case and the data allowed to pass through uncorrected. The reason for this inability to correct the data can be seen from FIG. 12. A drop out B and C is shown on lines 1 and 4 respectively with a corresponding check sum error being present. A parity bit error will also be present as shown and because of the drop out on two lines the system becomes confused and cannot tell whether the drop outs are at B and C or whether they have occurred at A and D (which in this example they have not).

A refinement to the above system now described allows such an exceptional drop out situation to be coped with by manipulating the data to disguise or conceal the drop out when more than one line in the block has drop outs. Whilst the previous and present schemes will absolutely correct the data when there are errors on only one line, the present scheme will only conceal rather than correct the error when more than one line is involved.

In order to conceal the drop outs, use is made of the normal sampling relationship relative to subcarrier. In this example it is assumed that the sampling rate is 4×fsc but other rates could be used with subsequent modification of the system. The present system is generally similar to the FIG. 8 arrangement although the formatting of the data now corresponds to that shown in FIG. 13 and the comparator and corrector block 29 is modified relative to FIG. 10 to cope with the additional control functions required.

Figure 13:
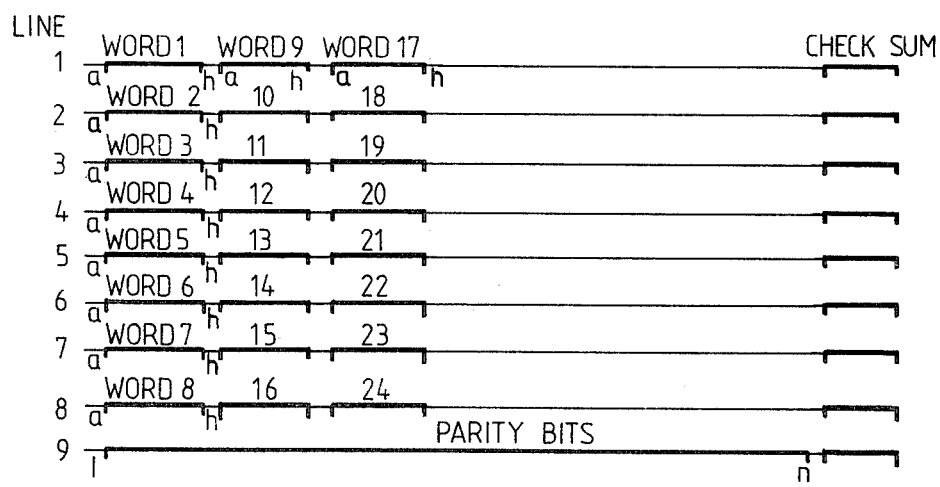
FIG. 13 shows the data format adopted in the second embodiment.

Comparison of FIGS. 4, 6 and 13 will show that rather than the standard serial word format or the single bit successive word format of the earlier embodiment, the FIG. 13 format utilises non-sequential words along a given line. Thus in this embodiment using 8 lines plus 1 parity line in the block, word 1 is followed by words 9 and 17 and so on until the entire line is filled and including the check sum as the last data word on that line. Line two has word 2, 10, 18 etc with a similar eight word gap on the successive lines in that block. The ninth line will carry parity bit data and check sum as before.

Figure 9:
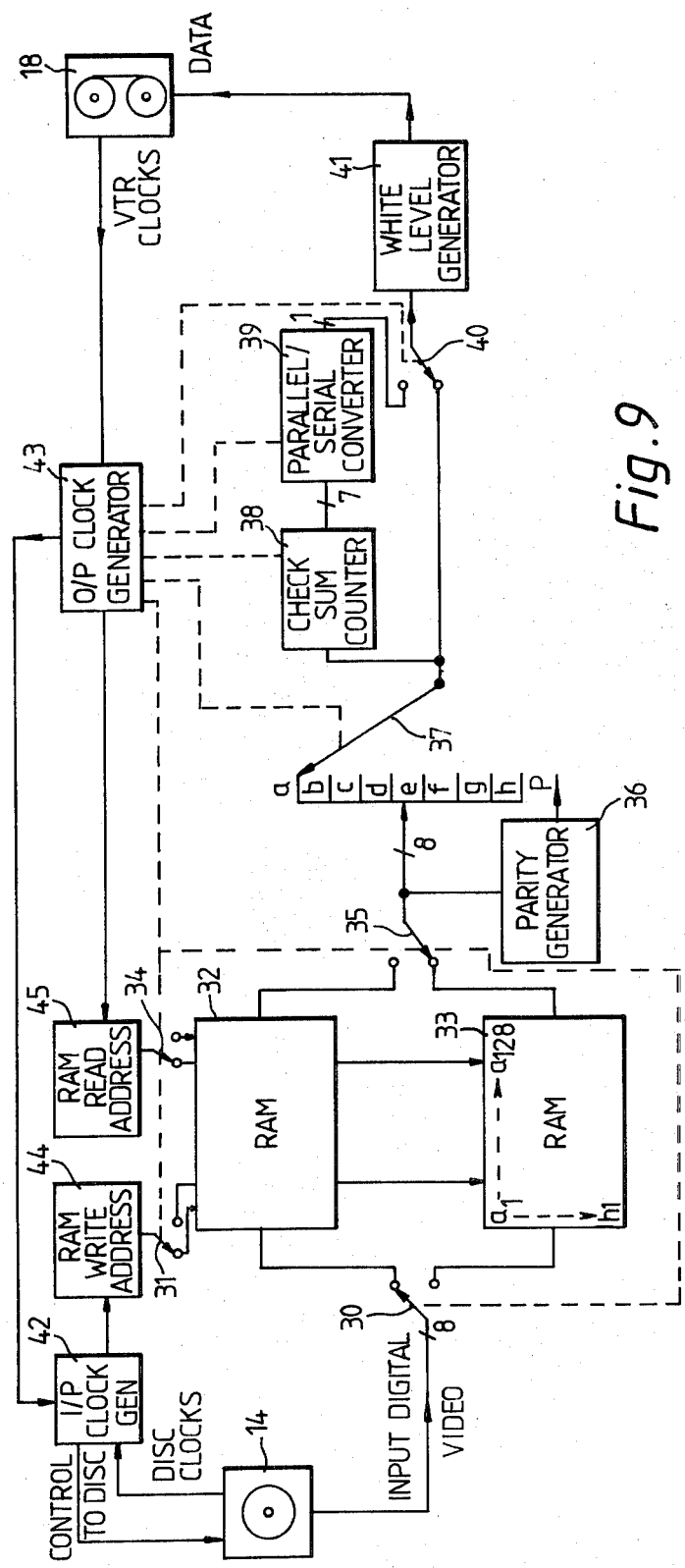
FIG. 9 shows one arrangement for producing the desired format and coding on the record side of the system.
Figure 14:
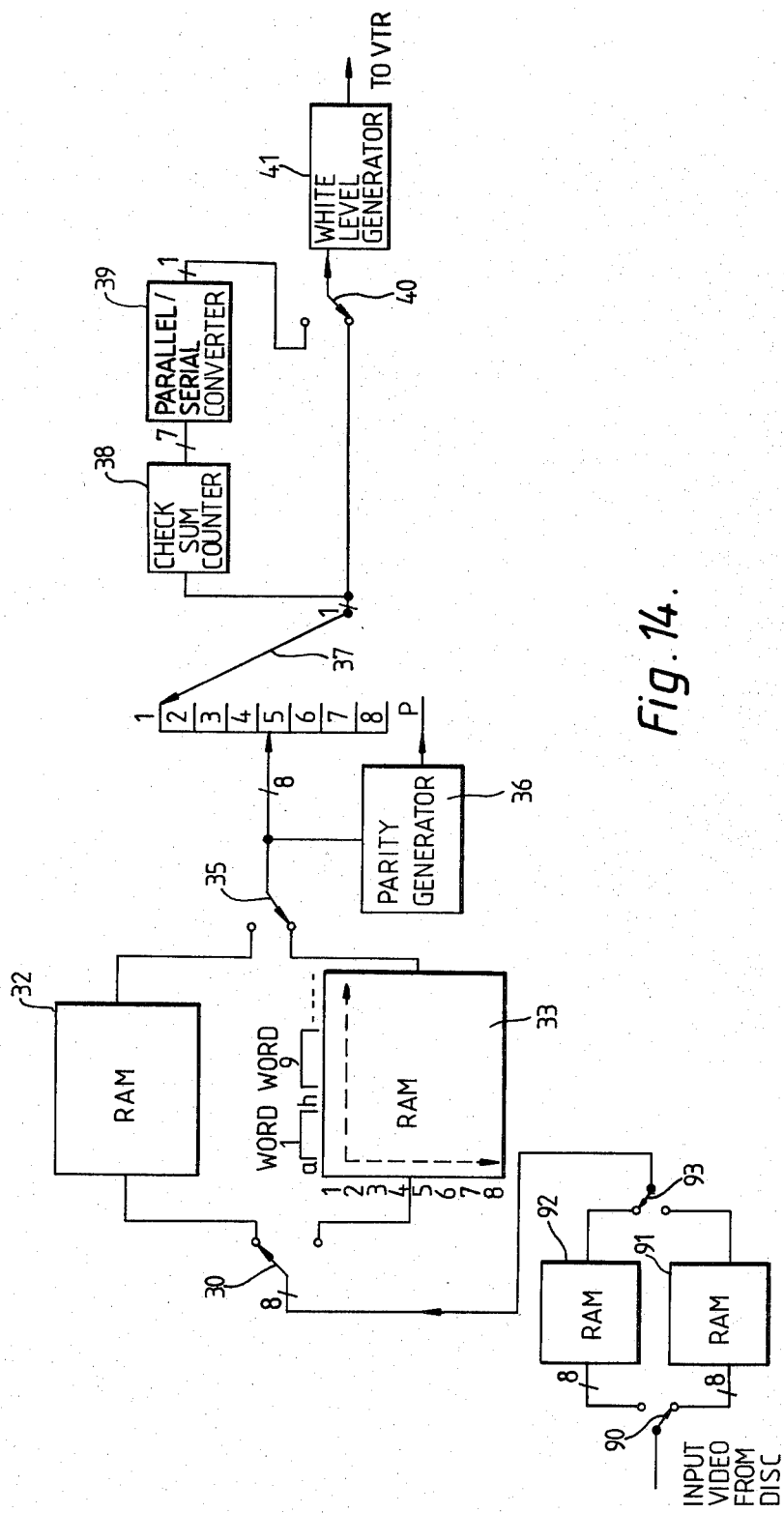
FIG. 14 shows one arrangement for providing this format prior to recording.

An arrangement for producing the desired format and coding on the record side of the system is shown in FIG. 14 and is similar to the FIG. 9 arrangement except for the additional RAM stores 91 and 92 with associated switches 90 and 93. The system uses addressing and sequencing techniques for the RAMs and switches in similar manner to FIG. 9, although now the additional switches 90 and 93 and RAMs also are under the influence of the output clock generator.

Figure 15:
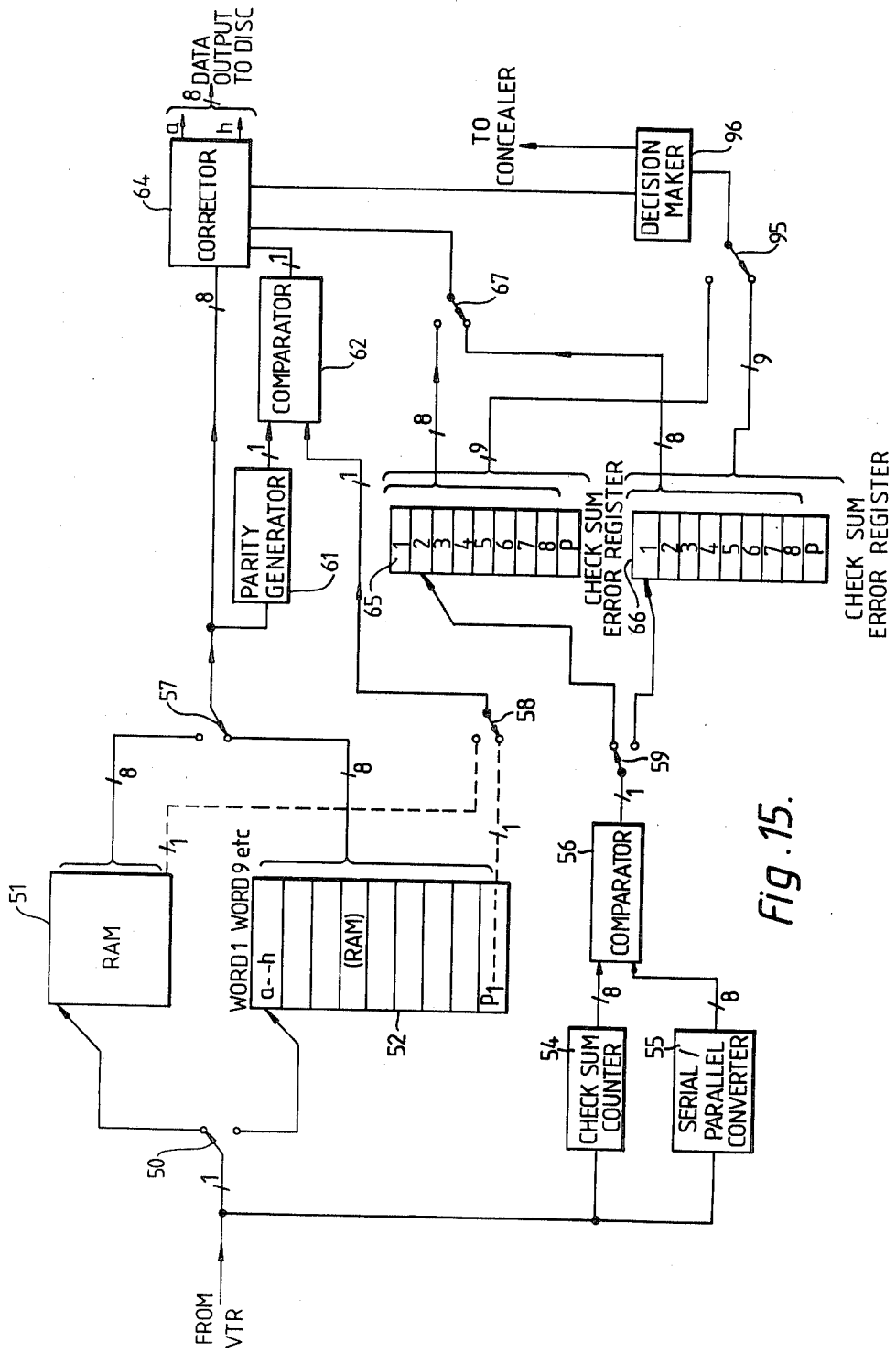
FIG. 15 shows manipulation of the data following playback.

The incoming video is routed via switch 90 to either RAM 91 or 92. The data is written into the RAM in the sequence received, viz words 1,2,3,4 etc until the RAM is full when switch 90 is changed to input data to the second RAM. Whilst one RAM is receiving data the other is available for read out via switch 93. The read addressing is chosen such that the words are read out in the sequence 1, 9, 17, 25 etc followed by words 2, 10, 18, 26 etc and so on as in the FIG. 13 format for the eight lines in the block. The data is passed from either RAM 91 or 92 via switches 93 and 30 to RAM 32 or 33 and further processing for parity and check sum is effected on read out under control of the output clock generator as before, prior to recording. The playback arrangement of FIG. 15 now described is similar to the FIG. 10 configuration except that additional capacity is provided for registers 65 and 66 so that they have the facility to handle errors on the parity bit line (line 9). Also a further switch 95 is provided to connect all 9 locations to a decision making circuit block 96. The decision maker looks at any check sum error on lines 1 to 9 to control the corrector 64 or to actuate the concealer (described below). There are three cases which can be encountered by the decision circuit as follows:

Case 1

If one and only one check sum error on one of the lines 1 to 8 is present without a check sum error on line 9 then the corrector 64 operates normally as in the earlier embodiment. (These are 8 possibilities for this case occurring.)

Case 2

If a check sum error is present only on line 9 then the corrector is inhibited as is the concealer, so that effectively there is no change to the output video. (There is only one possibility for this case to occur.)

Case 3

If a check sum error is detected on more than one of the lines 1 to 8 then any parity check sum error is ignored, and the corrector is inhibited but the concealer is brought into operation. (There are 247 possible case 3 situations.)

Figures 16, 17:
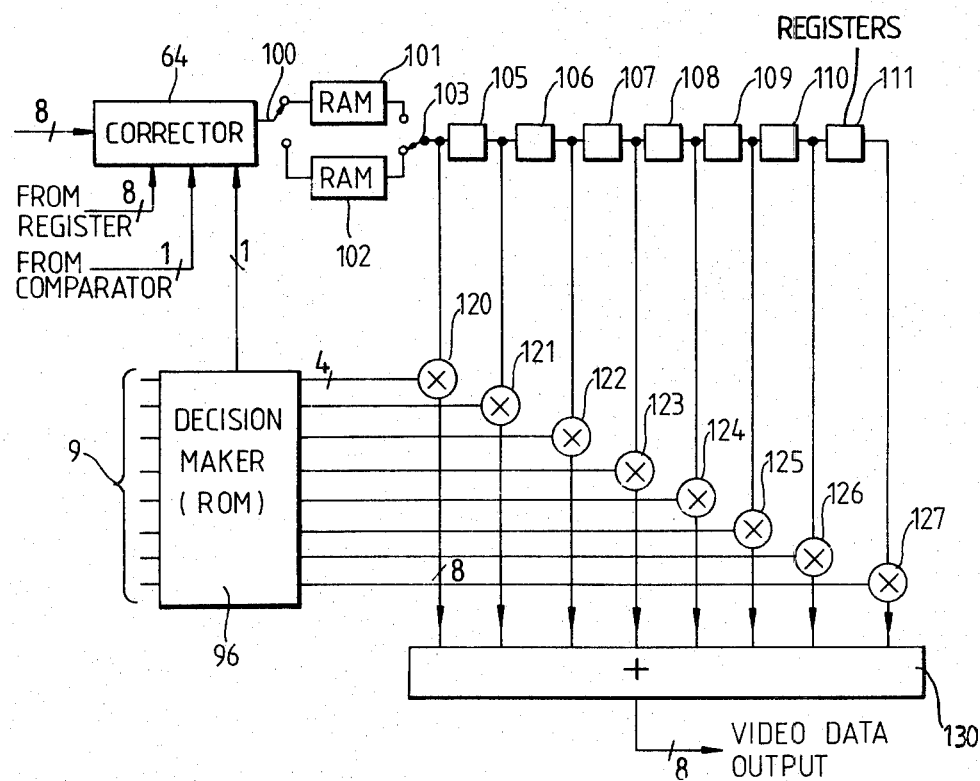
FIG. 16 shows examples of possible situations resulting from the check sum comparison.
FIG. 17 shows the concealment aspect in more detail.

Examples of possible check sum register situations are given by way of example in FIG. 16 illustrating the three possible cases.

The decision making and concealment aspects are now described in greater detail with reference to FIG. 17. The corrector 64 is shown receiving the 8 inputs from the check sum error registers and the single input from the comparator of the FIG. 15 arrangement. The decision maker 96 comprises a read only memory (ROM) which is programmed with decision laws such that the correct decision is reached for all the possible cases to be encountered as explained above. Thus the 9 inputs from the check sum error registers are used to access a certain address within the preprogrammed ROM and the data at that location is output for use in controlling the concealer and also the operation of the corrector 64. The concealer comprises registers 105 to 111, multipliers 120 to 127 and adder 130. To format the data into the desired sequence a pair of RAMs 101 and 102 are provided together with associated switches 100 and 103. Thus assuming no correction, the data passes through corrector 64 in the sequence word 1, word 9, word 17 etc and is written into RAM 101 or 102 so that on read out the sequence becomes word 1, word 2, word 3, etc. The data passes through the registers 103-111, which registers are each 8 bits wide×1 bit long. Thus after 8 words have been read out of the RAM, then the 8 bit word 1 will be present at the output or register 111, word 2 will be present at the output of register 110 and so on with word 8 being present at the output of the RAM. The words are received by the respective digital multipliers 120-127 and the respective coefficient for each multiplier is provided by the decision maker 96. The multiplier outputs are received by adder 130 which provides the summed video output from the concealer.

The operation of the decision maker in combination with the concealer is now described for the three case situations described above.

Case 1

The decision maker receives the output from the check sum error registers and produces binary data such that the corrector is on (i.e. not inhibited) to operate normally and the concealer is off (i.e. transparent) by selecting one of the coefficients to be 1 and the remainder to be zero so that the video passes through the concealer without modification.

Case 2

The output from the decision maker produces an inhibit signal to the corrector to prevent any correction of data so that it is effectively transparent. One of the coefficients is selected to be 1 and the remainder zero so that the concealer is also transparent.

Case 3

The decision maker output causes the corrector to be inhibited to remain transparent and the concealer to operate to conceal the drop out errors. Thus assuming an error on words 1 and 4 then the scaling coefficients are output to be zero for words 1 and 4 and to substitute for this, by selecting appropriate fractions of other words. The choice of the words to be used as substitutes is governed by the relationship between the sampling rate and colour subcarrier. In the case of 4fsc sampling these are selected to be words 2 and 5 for word 1 and words 3 and 5 for word 4.

Figure 18:
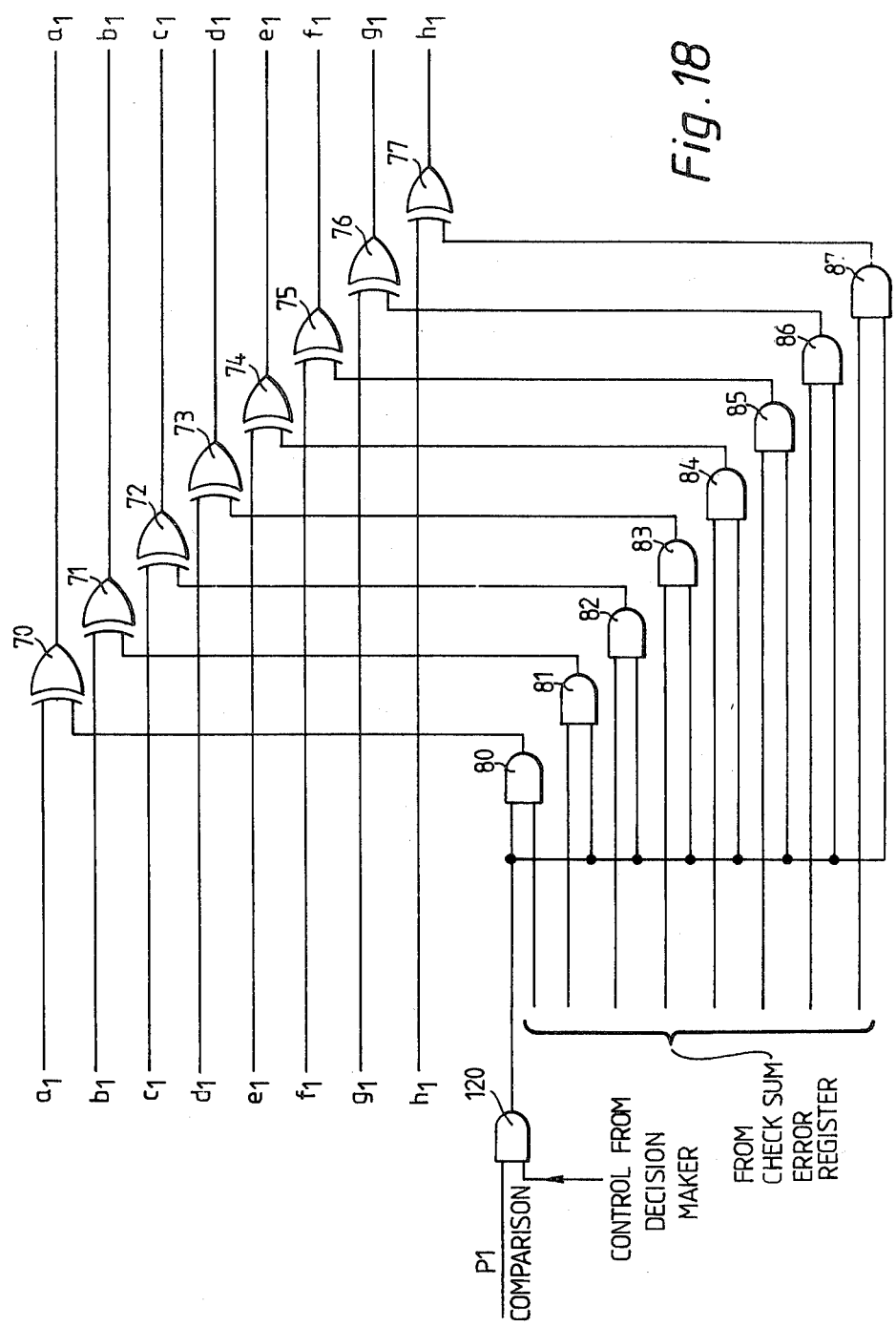
FIG. 18 shows the modified data corrector.

The corrector as described can be inhibited under the control of the decision maker. This is achieved by including additional AND gate 120 as shown in FIG. 18 so that the comparator output is only allowed to pass to the remaining AND gates when control signal from the decision maker is received.

Although the system has been described as cooperating with an analogue video tape recorder, digital tape recorders are now becoming available and the system may have utility with this latter type of recorder.

We claim:

1. A video data transfer system which includes a source of digital video signals in bit-serial mode, means for interspersing television line period synchronising signals in said serial mode digital video signals so that said signals can be recorded on magnetic tape by means of a video tape recorder, means for providing, in certain line periods separated from each other by a plurality of line periods occupied by said digital video signals, parity bit signals which relate respectively to the plurality of bits of the digital signals occurring at corresponding positions in a plurality of adjacent line periods, and means for providing, in each line period, a digital error check code signal related to the digital video signals or parity bit signals occurring in the respective line period, said parity bit signals and said error check code signals facilitating the subsequent detection of drop outs which might occur on recording the various signals on magnetic tape and their replay therefrom.

2. A video data transfer system according to claim 1 said source of video signals including means for distributing digital video signals relating to picture elements on a line on the corresponding picture over a plurality of line periods as determined by said synchronising signals, the distribution being such that a plurality of digital video signals relating to a block of adjacent picture elements on a line in the picture occur in corresponding positions in a respective plurality of line periods to which the same parity bit signals relate.

3. A video data transfer system according to claim 1, comprising means for receiving said serial mode digital video signals, said parity bit signals and error check code signals on replay thereof from magnetic tape, and error detecting means responsive to said error check code signals for detecting lines of digital video signals including drop-outs and to said parity bit signals for detecting at which location in the respective plurality of lines a drop-out occurred, and correcting means responsive to said error detecting means for replacing a drop-out in the digital video signals which is detected and located thereby.

4. A video data transfer system according to claim 3 further including error concealing means arranged, in the event of said error detecting means indicating errors in two digital video signals occuring in a plurality of adjacent line periods to which the same parity bit signals relate, to produce for each such digital video signal a weighted sum of digital video signals relating to positionally adjacent picture elements, the respective digital video signal being replaced by said weighted sum.

5. A video data transfer system according to claim 4 including means for applying to said error concealing means a plurality of digital video signals relating to the respective block of adjacent picture elements, to form said weighted sum.

6. A method of transferring video data which comprises the steps of providing digital video signals in bit-serial mode so that said digital video signals occupy groups of television line periods, providing parity bit signals in certain line periods between said groups which are not occupied by said digital video signals, interspersing television line period synchronising signals in said serial mode digital video signals and parity bit signals so that said signals can be recorded on magnetic tape by means of a video tape recorder, said parity bit signals being generated so as to relate respectively to the plurality of bits of the digital video signals occurring at corresponding positions in the group of adjacent line periods, and providing in each line period a digital error check code signal related to the digital video signals or parity bit signals occurring in the respective line period, said parity bit signals and said error check code signals facilitating the subsequent detection of drop outs which might occur on recording of the various signals on magnetic tape and their replay therefrom.

7. A method according to claim 6, wherein said various signals are recorded on magnetic tape and replayed therefrom and wherein drop outs in the replayed signals are detected and located in response to said digital error check code signals and parity bit signals, and wherein said drop outs are replaced when detected and located.

8. A method according to claim 7, wherein in the event that said parity bit signals and said digital error check code signals indicate errors in two replayed digital video signals occurring in a plurality of adjacent line periods to which the same parity bit signals relate a weighted sum of digital video signals relating to positionally adjacent picture elements is inserted in place of each respective replayed digital video signal.

9. A method according to claim 6, wherein said serial mode digital video signals are assembled in such form that digital video signals relating to picture elements on a line on the corresponding picture are distributed over a plurality of line periods as determined by said synchronising signals, the distribution being such that a plurality of digital video signals relating to a block of adjacent picture elements on a line occur in corresponding positions in the respective plurality of line periods to which the same parity bit signals relate.

* * * * *